No. 877,248. PATENTED JAN. 21, 1908.
E. A. SPERRY.
METHOD OF MAKING STANNIC CHLORID.
APPLICATION FILED FEB. 20, 1907.
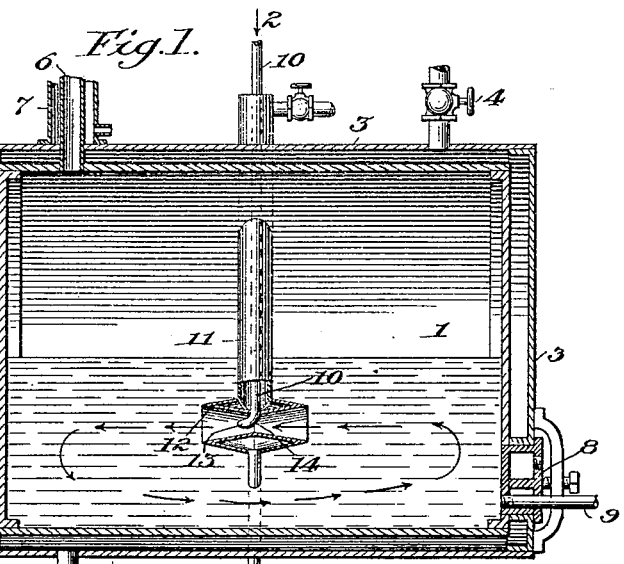
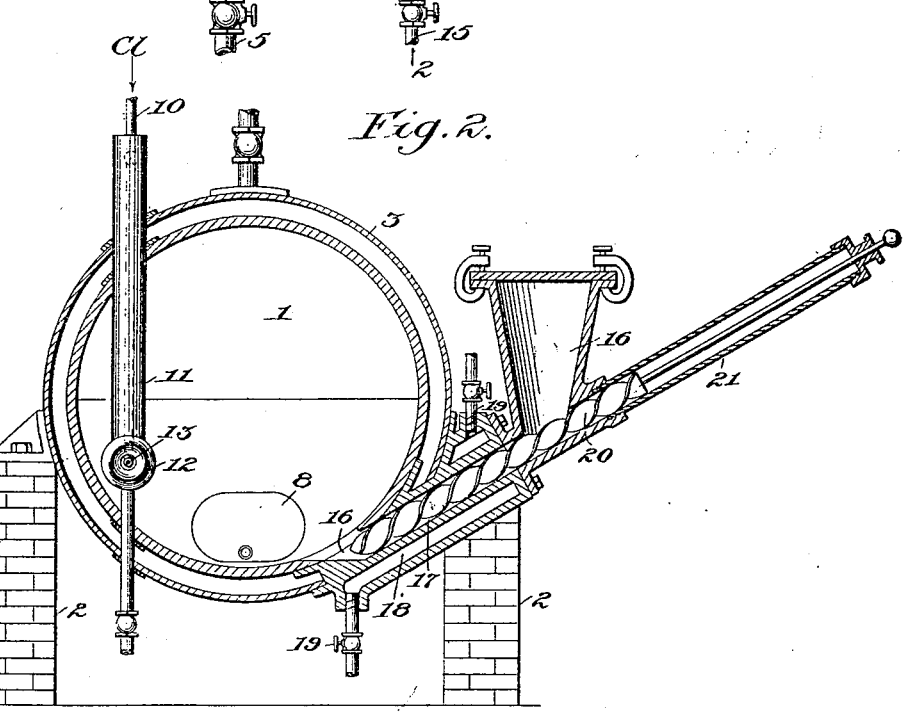
Witnesses:
Chas. H. Potter
E. G. Fullam
Inventor:
Elmer A. Sperry
by Byrnes Townsend
Att'ys.

UNITED STATES PATENT OFFICE.

ELMER A. SPERRY, OF BROOKLYN, NEW YORK.

METHOD OF MAKING STANNIC CHLORID.

No. 877,248.    Specification of Letters Patent.    Patented Jan. 21, 1908.

Application filed February 20, 1907. Serial No. 358,490.

*To all whom it may concern:*

Be it known that I, ELMER A. SPERRY, a citizen of the United States, residing at Brooklyn, in the county of Kings and State of New York, have invented certain new and useful Improvements in Methods of Making Stannic Chlorid, of which the following is a specification.

This invention is a method of making stannic chlorid by reacting with chlorin upon a tin-bearing material in presence of anhydrous stannic chlorid. In the preferred embodiment of the invention the stannic chlorid is present as a liquid in which a tin-bearing material is submerged or suspended, and gaseous chlorin is introduced beneath the surface of said liquid.

In the use of pure and dry chlorin, and in the absence of moisture, this method of procedure presents only such difficulties as may arise from the presence or transfer of the gas under such pressure as is required to overcome a given head of liquid. Commercial chlorin however is ordinarily diluted with the elements of air, with variable proportions of hydrochloric acid, carbon dioxid, etc., depending upon the method of its production, and with considerable proportions of moisture. As is well understood, anhydrous stannic chlorid exhibits a high degree of affinity for moisture, uniting therewith to form hydrated salts which are solid at normal temperatures but fusible at temperatures below the boiling point of water. If it be attempted to introduce moist chlorin into a body of liquid anhydrous stannic chlorid below the surface thereof it will be found that a solid hydrated chlorid will be deposited within and around the orifice through which the gas is discharged, extending even into the inlet conduit as far as the vapors of stannic chlorid have penetrated. At temperatures below its melting point this deposit is extremely hard and resistant, and in proceeding as above described the inlet tube becomes completely stopped in a short time, depending upon the size of the orifice, the quantity of gas introduced, and the proportion of moisture therein. Under these conditions the operation is necessarily intermittent, and by reason of the character of the gas and the product is essentially impracticable and uncommercial. I have found that by maintaining the temperature at or near the discharge orifice at or above the melting point of the hydrated chlorid which is formed under the particular conditions of operation, this orifice is kept clear and the chlorin, even though saturated with moisture, may be introduced in a regular or continuous manner. The melting point of the hydrated chlorid formed is comparatively low and probably does not in any case exceed 80°–90° centigrade.

The temperature at the discharge orifice may be maintained at or above the melting point of the hydrated chlorid in any suitable manner, as for instance by such careful regulation of the temperature of the contents of the vessel that the same is maintained between the melting point of the hydrated chlorid and the vaporizing point of the chlorinated liquid. It is understood that the temperature of the mass varies with the rate of reaction and the weight of the reacting materials, and such regulation as is here referred to may involve either the heating or the cooling of the vessel.

Instead of regulating the temperature of the entire charge, it is often preferable to apply heat locally at or near the discharge orifice for chlorin. This is conveniently effected by jacketing the chlorin inlet and circulating a heating medium through the jacket. In case the installation is a large one this local heating of the inlet need not greatly alter the temperature conditions within the vessel, and these may be maintained by other means at the desired point.

I prefer to utilize the pressure of the gas to establish a circulation of the contents of the vessel, whereby all portions of the liquid are brought successively to the region of the orifice and the solution of the gas is rendered rapid and uniform.

For a full understanding of the invention reference is made to the accompanying drawing showing a preferred form of apparatus for carrying the same into effect, wherein:

Figure 1 is a central vertical section of a reaction vessel; and Fig. 2 is a transverse vertical section of the same on the line 2—2 of Fig. 1.

1 represents a reaction vessel, shown as a drum, preferably of iron, mounted on supports 2. A jacket 3 surrounds the drum and is provided with the usual inlet and outlet 4, 5 for steam, water, or other medium for controlling the temperature.

6 represents the outlet pipe for uncondensed gases, preferably provided with a heating jacket 7.

8 is the discharge outlet for solid residues, a pipe 9 serving to withdraw the stannic chlorid, or a portion of it, in liquid form if desired. This pipe may also serve as an air inlet to aid the distillation, in case it is desired to distil the stannic chlorid produced directly from the reaction vessel.

10 represents the chlorin inlet pipe, which extends beneath the normal liquid level and is provided with a heating jacket 11. As shown this jacket is expanded at its lower or submerged end into a casing 12 surrounding the chlorin discharge orifice 13. As illustrated the chlorin inlet pipe 10 is bent near its end into a substantially horizontal position, and the horizontal portion of the inlet pipe is surrounded by the casing 12, the latter being contracted at its central point 14; these elements constitute an injector so constructed that the gas discharge induces a liquid flow in the general direction indicated by the arrows in Fig. 1. The jacket is shown as encircling the injector, and as provided with a drip pipe 15.

The feeding means for tin comprises a covered hopper 16 communicating with the lower portion of the vessel 1 by a conduit 17 having a jacket 18 provided with steam connections 19. The mechanical feeder shown comprises a screw 20 which may be hand or power operated, and which is preferably contained in an elongated casing 21 so that in case of necessity it may be fully retracted; this construction also permits the feed to be effected by turning or ramming as may be desired. The heating of the tin-bearing material is of particular importance in case traces of moisture are present therein, and the temperature at the orifice 16 should in this case be maintained above the melting point of the hydrated chlorid, whereby obstruction is avoided precisely as in the case of the discharge orifice for chlorin.

At the close of the operation the liquid chlorid may be withdrawn, preferably after the addition of such weight of tin-bearing material as may be required to combine with any excess of chlorin in the vessel; or the liquid chlorid may be distilled through the outlet 6, and condensed or collected in any suitable manner.

I claim:

1. The method of making stannic chlorid which consists in reacting with chlorin on a tin-bearing material in presence of liquid anhydrous stannic chlorid, introducing the reacting bodies as required, and preventing obstruction of the inlet or inlets.

2. The method of making stannic chlorid which consists in reacting with chlorin on a tin-bearing material in presence of liquid stannic chlorid, introducing chlorin beneath the surface of the liquid, and preventing obstruction of the chlorin inlet.

3. The method of making stannic chlorid which consists in reacting with chlorin on a tin-bearing material in presence of liquid stannic chlorid, introducing moist chlorin beneath the surface of the liquid, and heating the chlorin inlet.

4. The method of making stannic chlorid which consists in reacting with chlorin on a tin-bearing material in presence of liquid stannic chlorid, introducing chlorin beneath the surface of the liquid, heating the chlorin inlet, and effecting a circulation of the liquid by means of the chlorin and associated gases.

5. The method of making stannic chlorid which consists in submerging a tin-bearing material in liquid stannic chlorid, introducing moist chlorin beneath the surface of the liquid, and heating the chlorin inlet.

6. The method of making stannic chlorid which consists in reacting with chlorin on a tin-bearing material in presence of liquid anhydrous stannic chlorid, introducing the reacting bodies as required, and preventing obstruction of the inlet or inlets by maintaining at the same a temperature above the melting point of hydrated stannic chlorid.

7. The method of making stannic chlorid which consists in reacting with chlorin on a tin-bearing material in presence of liquid anhydrous stannic chlorid, and preventing obstruction of the chlorin inlet by maintaining at the same a temperature above the melting point of hydrated stannic chlorid.

8. The method of making stannic chlorid which consists in reacting with chlorin on a tin-bearing material in the presence of a suitable anhydrous liquid, introducing the chlorin under pressure beneath the surface of the liquid, agitating the mass by the introduction of such chlorin and preventing obstruction of the chlorin inlet.

In testimony whereof, I affix my signature in presence of two witnesses.

ELMER A. SPERRY.

Witnesses:
F. D. THROOP,
GEO. A. FISHER.